US011721193B2

(12) United States Patent
Martin et al.

(10) Patent No.: US 11,721,193 B2
(45) Date of Patent: Aug. 8, 2023

(54) LOAD CENTER POSITION-BASED ADDRESSING

(71) Applicant: Schneider Electric USA, Inc., Boston, MA (US)

(72) Inventors: Daniel Martin, Apex, NC (US); Gregory Harrison, Holly Springs, NC (US); John Charles Foust, Zebulon, NC (US); Matthew Furnari, Raleigh, NC (US); Amy Gau, Apex, NC (US)

(73) Assignee: Schneider Electric USA, Inc., Boston, MA (US)

( * ) Notice: Subject to any disclaimer, the term of this patent is extended or adjusted under 35 U.S.C. 154(b) by 0 days.

(21) Appl. No.: 17/340,339

(22) Filed: Jun. 7, 2021

(65) Prior Publication Data

US 2021/0295671 A1    Sep. 23, 2021

Related U.S. Application Data

(63) Continuation of application No. 16/540,630, filed on Aug. 14, 2019, now Pat. No. 11,037,427.

(51) Int. Cl.
*G08B 21/18* (2006.01)
*H02B 1/20* (2006.01)
(Continued)

(52) U.S. Cl.
CPC ............ *G08B 21/18* (2013.01); *H02B 1/052* (2013.01); *H02B 1/205* (2013.01); *H04Q 9/14* (2013.01); *H04Q 2209/30* (2013.01)

(58) Field of Classification Search
CPC ......... G08B 21/18; H02B 1/052; H02B 1/205
See application file for complete search history.

(56) References Cited

U.S. PATENT DOCUMENTS 5,010,445 A * 4/1991 Weinold ............... H01H 15/005
                                                    361/728
5,455,760 A    10/1995 Bilas et al.
(Continued)

FOREIGN PATENT DOCUMENTS

EP          1921728 A2      5/2008

OTHER PUBLICATIONS

International Search Report and Written Opinion dated Sep. 16, 2020 for International Patent Application No. PCT/US2020/046152, 8 pages.
(Continued)

*Primary Examiner* — Benyam Haile
(74) *Attorney, Agent, or Firm* — Locke Lord LLP (57) ABSTRACT

Embodiments of the disclosure provide for a system and method for determining a circuit breaker position in a power distribution/load center. In one embodiment, the load center includes a plurality of circuit breakers. Each circuit breaker includes a base and a plurality of contact components coupled to the base. In that regard, an activation of a combination of the contact components indicates a position of the circuit breaker within the load center. The activation of the combination indicates that one or more of the contact components is in contact with one or more pegs coupled to the load center. When this occurs, a data transceiver coupled to each of the contact components transmits a data signal. The data signal includes a plurality of data bits, where each data bit indicates whether a corresponding contact component of the combination is activated or not activated.

26 Claims, 7 Drawing Sheets

(51) Int. Cl.
 *H04Q 9/14* (2006.01)
 *H02B 1/052* (2006.01)

(56) References Cited

U.S. PATENT DOCUMENTS

| | | |
|---|---|---|
| 9,147,545 B2 | 9/2015 | Broghammer |
| 9,715,796 B2 | 7/2017 | Reid |
| 2002/0105770 A1 | 8/2002 | Seese |
| 2007/0291433 A1 | 12/2007 | Ziegler |
| 2008/0129301 A1 | 6/2008 | Harmon |
| 2010/0164744 A1 | 7/2010 | Parker et al. |
| 2013/0043111 A1 | 2/2013 | Venkitachalam |
| 2014/0233160 A1* | 8/2014 | Ferri .................. G01B 7/003 361/627 |
| 2018/0007021 A1 | 1/2018 | Deriso |
| 2019/0179276 A1* | 6/2019 | Asp .................. H02J 3/14 |

OTHER PUBLICATIONS

European Search Report and Search Opinion dated Jun. 15, 2023 for corresponding European Patent Application No. 20851645.0, 9 pages.

\* cited by examiner

LOAD CENTER POSITION-BASED ADDRESSING

This application is a continuation of, and claims priority under 35 U.S.C. § 120 to, U.S. patent application Ser. No. 16/540,630, filed on Aug. 14, 2019, the entire contents of which are incorporated by reference herein in their entirety.

TECHNICAL FIELD

The disclosure relates to circuit breakers, and more particularly, to load center position-based addressing.

BACKGROUND

In a typical power distribution system in a residential or commercial building, an array of electromechanical circuit breakers protects various branch circuits of the electrical wiring. Such circuit breakers utilize a thermally operated switch which, for example, upon reaching a predetermined temperature due to excessive current passing therethrough or detecting a fault condition (e.g., short circuit, magnetic, ground fault, arc fault, etc.), will "trip" and open the circuit connected to the switch. To resume electrical flow to the circuit, the operator must physically reconnect the circuit breaker, typically by throwing a mechanical switch back to a closed position.

SUMMARY

In accordance with the disclosure, a system for determining a circuit breaker position in a power distribution (load) center is provided. In example, a circuit breaker is provided. The circuit breaker comprises: a base; and a plurality of contact components coupled to the base. An activation of a combination of the contact components indicates a position of the circuit breaker within a load center. In another example, a load center is provided. The load center includes a plurality of circuit breakers, each circuit breaker comprising: a base; and a plurality of contact components coupled to the base. The activation of the combination indicates that one or more of the contact components is in contact with one or more pegs coupled to the load center.

In some examples, a data transceiver is coupled to each of the contact components. The data transceiver transmits a data signal in response to the activation of the combination of the contact components. This data signal comprises a plurality of data bits, where each data bit indicates whether a corresponding contact component of the combination is activated or not activated. The one or more pegs are coupled to an addressing adapter that is configured to attach to the load center and each contact component is disposed within a guiding channel of the base. The guiding channel of the based is configured to receive the one or more pegs of a determined length. Furthermore, at least one of the pegs comprises a spring portion. The spring portion is reduced the determined length of the peg in response to connecting to a corresponding contact component. In that regard, the determined length of each page indicates whether the peg is configured to meet a corresponding contact component. When the peg is in connected to the corresponding contact component, the corresponding contact component is activated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Other features will be in part apparent and in part pointed out hereinafter.

BRIEF DESCRIPTION OF THE DRAWINGS

A more detailed description of the disclosure, briefly summarized above, can be had by reference to various embodiments, some of which are illustrated in the appended drawings. While the appended drawings illustrate select embodiments of this disclosure, these drawings are not to be considered limiting of its scope, for the disclosure can admit to other equally effective embodiments.

Identical reference numerals have been used, where possible, to designate identical elements that are common to the figures. However, elements disclosed in one embodiment can be beneficially utilized on other embodiments without specific recitation.

DETAILED DESCRIPTION

The increasing demand for energy and the use of finite resources for energy production have led to the increased use of smart grid technology for the production, transmission, distribution and consumption of energy to make, distribute and use energy more efficiently and wisely. With the rise of request for more functionality for the smart grid technology, there is a desire for more information concerning branch circuits to be available from a load center. In many instances, this information is desired to be exported from the load center to, for example, a main communication unit (e.g., a connected hub or aggregator). In some case, it would be beneficial to communicate various data from the individual circuit breakers defining the branch circuits to outside systems, thus supplying information of interest to the end user or other entities.

Aspects of the disclosure generally relates to a system for determining a circuit breaker position in a power distribution or load center. In accordance with some embodiments, the complexity of the system is containing within circuit breakers installed at the load center. Each circuit breaker is designed to communicate its position within the load center using transmitted signals, thus no connections between circuit breakers or panel wiring modifications are required. The position of the circuit breaker in the load center is broadcasted or in some situations discovered (e.g., by an aggregator) automatically by each individual circuit breaker from the positions in the load center without need for further set up procedures.

In one embodiment, the load center includes a plurality of circuit breakers. Each circuit breaker includes a base and a plurality of contact components coupled to the base. In that regard, an activation of a combination of the contact components indicates a position of the circuit breaker within the load center. The activation of the combination indicates that one or more of the contact components is in contact with one or more pegs coupled to the load center. When this occurs, a data transceiver coupled to each of the contact components transmits a data signal. The data signal includes a plurality of data bits, where each data bit indicates whether a corresponding contact component of the combination is activated or not activated.

It is this combination of the data bits transmitted by the data transceiver that indicates the circuit breakers positions in the load center. For example, the load center panels can include in each slot fit a number (e.g., 6) of pegs to aid with identification. In turn, the circuit breakers have a corresponding set of contact components to accommodate the insertion of the pegs into the circuit breaker when it is installed in the load center. The circuit breakers can compute their slot location based on inserted slots from the position they are plugged in the load center. For example, each slot location corresponds to a 0-based index, and each peg represents a physical representation of a binary identifier for each slot.

Then, the circuit breaker can communicate with a connected hub or aggregator to provide the relevant information (with zero user input) that may include circuit breaker location, size, type, etc. Thus, by providing the customers direct circuit breaker information from the load center, an advantage of the disclosure is that it helps reduce errors made during installation and commissioning of the branch circuit, improve efficacy, product accuracy and the overall customer experience in maintaining the load center.

Figure 1:
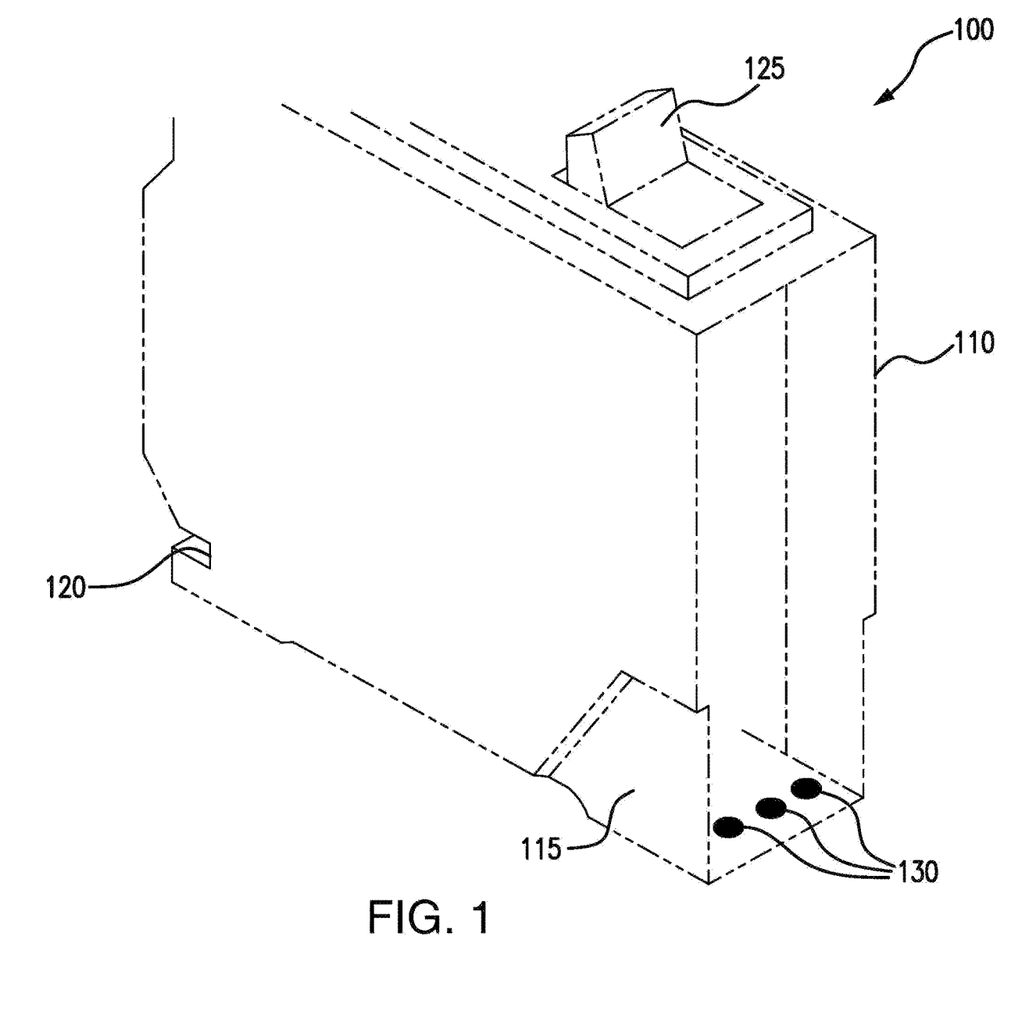
FIG. 1 illustrate a circuit breaker according to an embodiment of the disclosure.

FIG. 1 illustrate a circuit breaker 100 according to an embodiment of the disclosure. In this example, a perspective phantom outline of circuit breaker 100 is shown. The circuit breaker 100 is typically installed in a panelboard, load center or similar type of electrical distribution equipment for distributing power to the electrical distribution equipment from a power source. In some embodiments, the circuit breaker 100 includes a casing 110 having a base 115 that include a plurality of contact components 130. For example, the base 115 and contact components 130 may be positioned opposite a thermally operated switch 125 of the circuit breaker 100 although other configurations are possible.

The circuit breaker 100 is adapted to be engaged with a central power blade of a load center (not shown). In some embodiments, the circuit breaker 100 may include a mounting lug 120 that comes into engagement with load center such that the circuit breaker 100 is rotated at that point until the line contact (not shown) of the circuit breaker 100 is fully installed (e.g., mates with the central power blade) in a slot of the load center. Thus, the circuit breaker 100 is held firmly in the load center and against transverse movement by this mechanical engagement within the slot.

The activation of a combination of the contact components 130 indicates a position of the circuit breaker 100 within a load center. For example, a peg (not shown) may be received in a guiding channel (not shown) that is unitary with the interior frame of the circuit breaker 100 to actuate the contact components 130. In some embodiments, the contact components 130 can be pressure sensitive switch, such as a dome switch or can be implemented in any number of other manners, such as having the contact components printed directly on a printed circuit board. For example, the snap action of the dome switch with the contact components 130 in combination with one or more pegs (not shown) provide an activation of a combination of one or more contact components 130 when pressed by a peg. In some embodiments, the pegs may be configured so that none of the contact components 130 are actuated by any pegs, such as the first or Slot 1 of the load center may have 0 pegs indicated that the circuit breaker 100 is in Slot 1.

The plurality of contact components 130 are arranged in a contact layout for actuation by different combinations of peg layouts. Although contact components 130 may appear rounded, the contact components 130 can be shaped into various configurations. For example, the contact components 130 can be squared, triangle or other types of shapes. It is to be understood that although only three (3) contact components 130 are shown in FIG. 1, the contact layout can comprise a plurality of contact components 130 arranged in a plurality of rows and/or columns. Also, the spacing between the contact components 130 need not be uniform in any row but is preferably arranged to correspond with a peg layout, or more appropriately a plurality of page layouts, with which the circuit breaker 100 is intended to be used.

Figure 2:
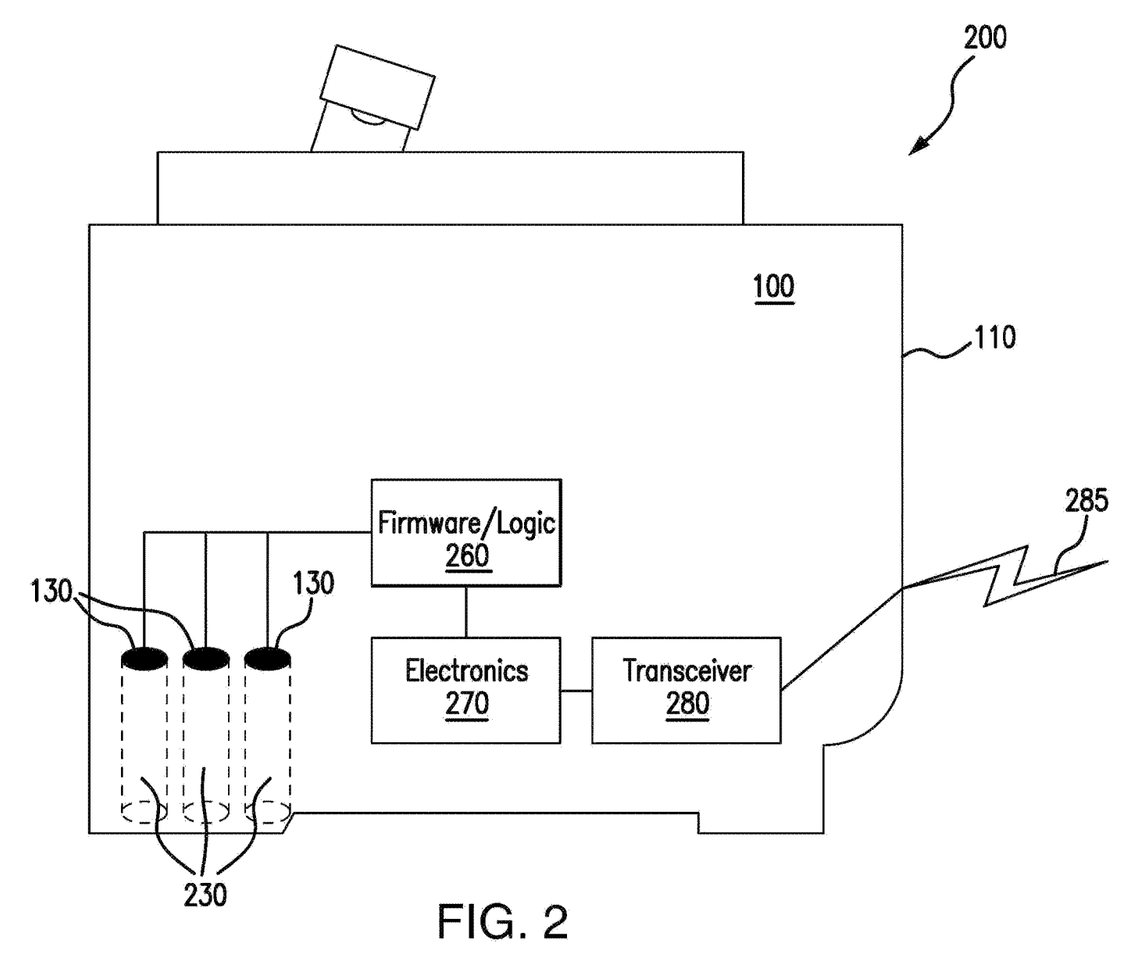
FIG. 2 is a perspective view of the circuit breaker of FIG. 1 according to an embodiment of the disclosure.

FIG. 2 is a perspective view 200 of the circuit breaker 100 of FIG. 1 according to an embodiment of the disclosure. As shown, the circuit breaker 100 may include a casing 110, one or more contact components 130 that indicate a position of the circuit breaker 100 within a load center. For example, one or more pegs may be received in a corresponding guiding channel 230 that is unitary with the interior frame of the circuit breaker 100. When a combination of the contact components 130 are actuated (e.g., pressed) by the one or more pegs, the circuit breaker 100 generated a data signal, such data signal 285, that indicates its position in the load center.

To generate a data signal 285 indicating a position in the load center, the circuit breaker 100 can be equipped with a logic unit or firmware 260, a transceiver 270 and other electronics 280. When the combination of the contact components 130 are actuated, the data signal 285 is then transmitted by used of the logic unit 260, e.g., which may be installed as a part of the electronics package of the circuit breaker 100. The electronics 280 or subset thereof, for the circuit breaker 100 are capable of encoding and reporting a self-status data signal 285 including operating data and a position identifier of the circuit breaker to the data transceiver 280.

The data transceiver 280 can transmit the self-status data signal 285 for the circuit breaker 100 through various wired or wireless techniques. The self-status data signal 285 may include a plurality of data bits. Each data bit of the data signal 285 indicates whether a corresponding contact component 130 of the combination is activated or not activated. For example, a data bit of one (1) may indicate that the corresponding contact component 130 is activated while a data bit of zero (0) indicates that the corresponding contact component 130 is not activated.

Each of the guiding channels 230 may include a corresponding one of the contact components 130 contained or otherwise disposed therein, as hardware and design may dictate. In some embodiments, a length of the guiding channels 230 may be based on the determined length and/or shape of the one or more pegs to be inserted thereto. In some alternative embodiment, the circuit breaker 100 may not include the guiding channels 230. For example, the contact components 130 may be attached directly to the base of the circuit breaker 100. In either case, the length of the one or more pegs may be arranged to correspond with the configuration of the circuit breaker 100 whether or not the breaker includes the guiding channels 230.

Figure 3:
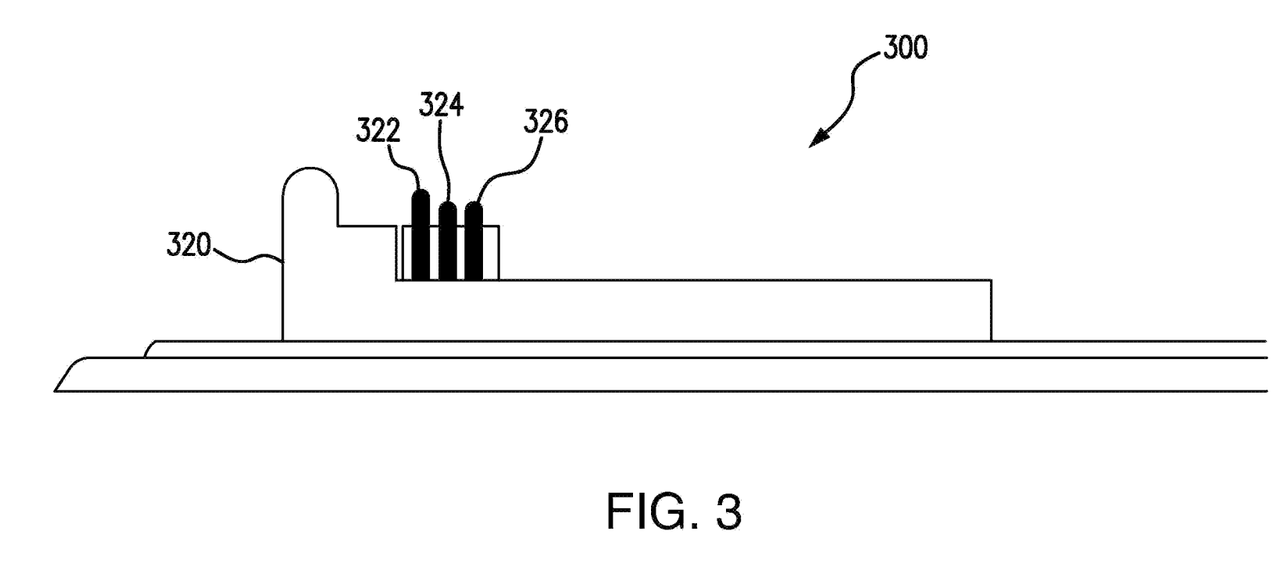
FIG. 3 is an example illustrating a portion of a load center according to an embodiment of the disclosure.

FIG. 3 is an example illustrating a portion of a load center 300 according to an embodiment of the disclosure. In this example, the load center 300 includes an interior assembly portion or port for receiving a circuit breaker, such as circuit breaker 100 of FIG. 1. The interior assembly 320 may include, for example, an integrally formed base, mounting rails, and at least one central power blade (not shown) supported and protected by a base of the load center 300. The circuit breaker 100 may be installed by inserting a mounting lug 120 of the circuit breaker 100 into the mounting rails of the load center 300. During the installation, the circuit breaker 100 can connect with one or more pegs 322, 324, 326 coupled to the load center 300. The pegs 322, 324, 326 are used to assist the circuit breaker 100 in self identifying its address at the load center 300.

As shown in FIG. 3, the pegs 322, 324, 326 are co-planar with the interior assembly 320 of the load center 300 and may protrude in certain direction (e.g., outwardly) therefrom. For example, the pegs 322, 324, 326 may be pointed towards a direction in which a circuit breaker may be placed onto the load center 300. The pegs 322, 324, 326 may be comprised of any rigid or semi-rigid material, such as a type of polymer or plastic. Although pegs 322, 324, 326 may appear rounded the pegs can be shaped into various configurations. For example, the pegs 322, 324, 326 can be squared, triangle or other types of shapes. In that regard, the shape of the guiding channels 230 of the circuit breaker 100 is configured to correspond with the shape of the pegs 322, 324, 326.

Although only three (3) pegs 322, 324, 326 are shown in FIG. 3, the layout can comprise a plurality of pegs 322, 324, 326 arranged in a plurality of rows and/or columns. Also, the spacing between the pegs 322, 324, 326 need not be uniform in any row, but is preferably arranged to correspond with the guiding channels 230 layout of the circuit breaker 100 that is intended to be used. Further aspects and configurations of the pegs 322, 324, 326 are discussed with reference to FIGS. 4A-4B.

Figure 4A:
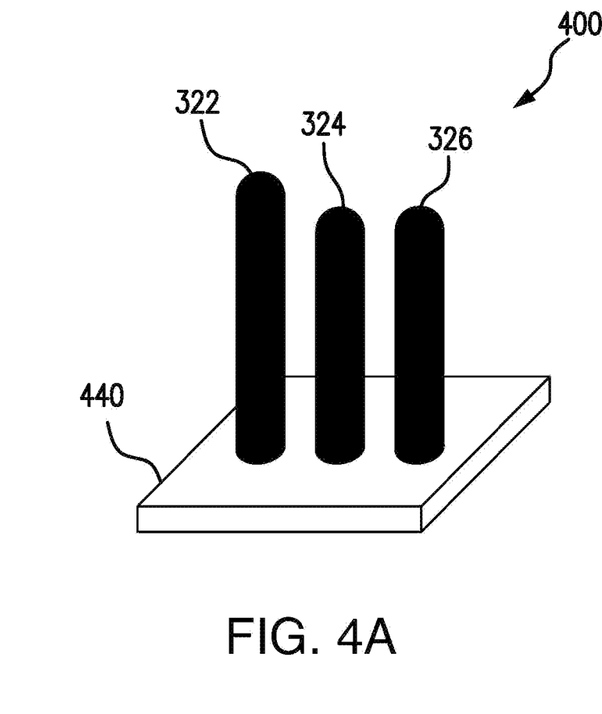
FIGS. 4A-4B are examples of an addressing adapter according to an embodiment of the disclosure.
Figure 4B:
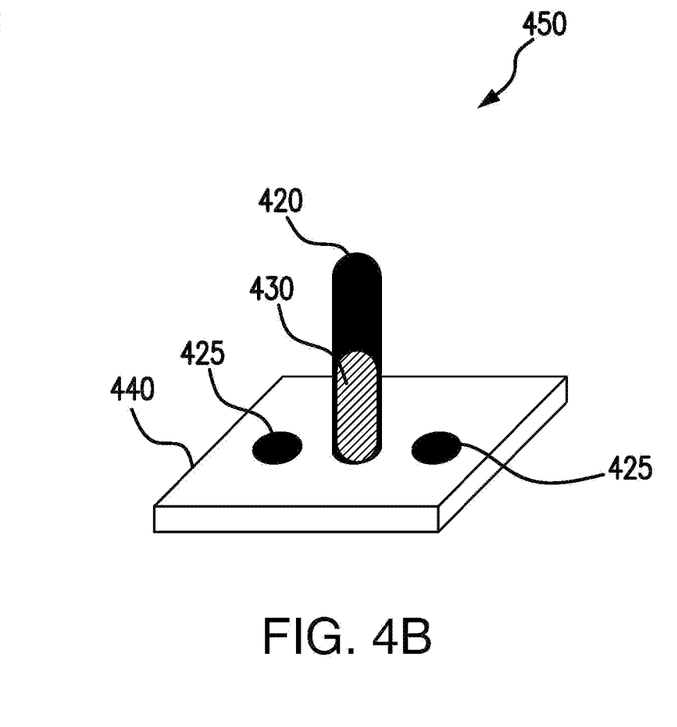

FIGS. 4A-4B are examples of an addressing adapter 400 and 450 according to an embodiment of the disclosure. To accommodate various kinds of load centers, the addressing adapter 400 and 450 may be used to facilitate the installation and configuration of the pegs, such as pegs 322, 324, 326, to achieve the benefits of the techniques disclosed herein.

As shown in FIG. 4A, the pegs 322, 324, 326 of may be attached or otherwise coupled to a base 440 of addressing adapter 400. The base 440 may be configured to attach to the load center, such as the interior assembly 320 of load center 300. For example, the base 440 can be configured to attach to support railings within the interior assembly 320. In alternative embodiments, the base 440 may be attached to the interior assembly 320 by use of various type of securing appliances. In some embodiments, the addressing adapter 400 may be arranged to apply to one or more slots of the load center. For example, the pegs to receive circuit breakers for more than one slot may be arranged on the base 440, which is then installed at the load center to apply to the corresponding slots therein.

As discussed, it is how the combination of pegs 322, 324, 326 are configured that determines which corresponding contact components, such as contact components 130, are activated to indicate an installed position of the circuit breaker. For example, the length of peg 322 is configured in this example to be longer than the length of pegs 324 and 326. This configuration may allow peg 322 to connect or otherwise press one of the contact components of the circuit breaker while pegs 324 and 326 do not. When the circuit breaker is installed in a slot of the load center that include addressing adapter 400, a data signal, such as data signal 285 of FIG. 2, is generated by the circuit breaker. This data signal 285 includes a certain data bit configuration, such as "100", to indicate the circuit breaker's slot position with respect to the load center.

In FIG. 4B, another configuration of the 4B the addressing adapter 450 is shown. In this example, the pegs 420, 425 are shown in different configurations. For example, the length of peg 420 is configured in this example to be longer than the length of pegs 425. In alternative embodiments, instead of pegs 425 being configured shorter, they may be removed or otherwise absent from the addressing adapter 450. When the circuit breaker is installed in a slot of the load center that include addressing adapter 450, a data signal, such as data signal 285 of FIG. 2, is generated by the circuit breaker. This data signal 285 may include a certain data bit configuration, such as "010", to indicate the circuit breaker's slot position with respect to the load center.

The one or more pegs, in alternative embodiments, may include a spring portion 430. An advantage of configuring the peg 420 with the spring portion 430 is it allows the peg 420 to be installed in a slot of the load center where there may be space limitations between the circuit breaker and the slot. For example, the spring portion 430 is configured to reduce the determined length of the peg 420 in response to connecting to a corresponding contact component of the circuit breaker. This allows the peg 420 to connect with the corresponding contact component without impacting the breakers installation due to space limitations.

Figure 5A:
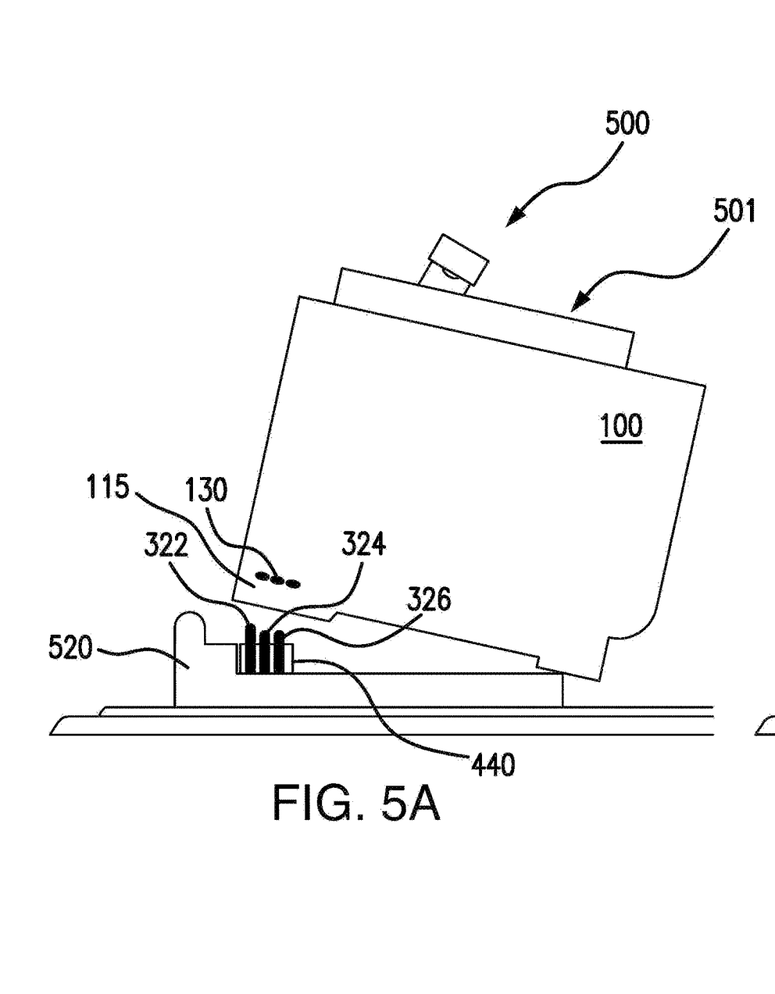
FIG. 5A-5B are examples illustrating a system according to an embodiment of the disclosure.
Figure 5B:
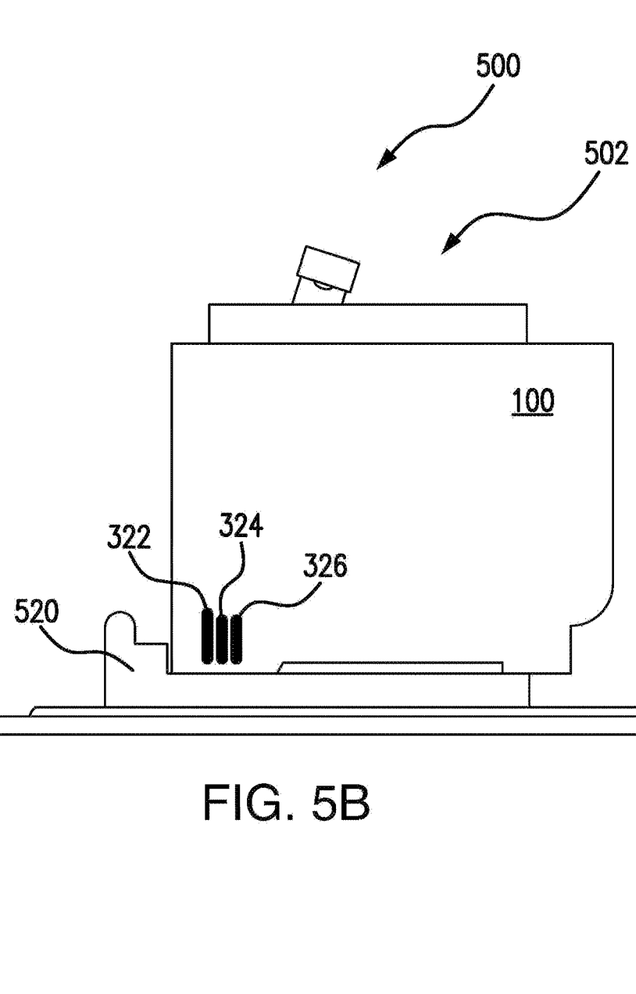

FIG. 5A-5B are examples illustrating a system 500 according to an embodiment of the disclosure. For example, the system may include a plurality of circuit breakers, such as circuit breaker 100 of FIG. 1. Each circuit breaker 100 includes, a base 115 and a plurality of contact components 130 coupled thereto. The system 500 further includes the one or more pegs, such as pegs 322, 324, 326, attached to a load center 520 (which may be the same as load center 320 for FIG. 3). In some embodiments, the pegs 322, 324, 326 of system 500 may be coupled to an addressing adapter, such as addressing adapter 440, that is configured to attach to the load center 320.

FIG. 5A illustrates the circuit breaker 100 being installed in the load center, for example, at a pre-installed position 501. The circuit breaker 100 is installed by inserting a mounting lug as defined by the circuit breaker casing, into a locking feature, defined by mounting rail of the load center 520. The circuit breaker assembly 100 must be positioned at an angle, with respect to the rear surface of the load center in a manner to permit the mounting lug to be inserted into the locking feature. The circuit breaker 100 can then be rotated about the mounting lug to an installed position (FIG. 5B).

During the installation, one or more of the pegs 322, 324, 326 may connect with one or more of the contact components 130. For example, one or more pegs 322, 324, 326, may be received in a corresponding guiding channel, such as guiding channel 230, that is unitary with the interior frame of the circuit breaker 100. When a combination of the contact components 130 are actuated (e.g., pressed) by the one or more pegs 322, 324, 326, the circuit breaker 100 generated a data signal, such data signal 285, that indicates its position in the load center.

FIG. 5B illustrates the circuit breaker 100 at an installed position 502 in the load center 520. For example, from the pre-installed position 501 of FIG. 5A, the circuit breaker 100 is rotated until a line contact (not shown) of the circuit breaker is fully installed (e.g., mates with a central power blade) in the load center 520. During the installation, one or more of the pegs 322, 324, 326 may connect with one or more of the contact components 130. For example, one or more pegs 322, 324, 326, may be received in a corresponding guiding channel, such as guiding channel 230, that is unitary with the interior frame of the circuit breaker 100. When a combination of the contact components 130 are actuated (e.g., pressed) by the one or more pegs 322, 324, 326, the circuit breaker 100 generated a data signal, such data signal 285, that indicates its position in the load center.

In the installed position 502, one or more of the pegs 322, 324, 326 may actuate or otherwise activate a combination of the contact components 130 of the circuit breaker 100. It is this activation of a combination of the contact components 130 that indicates a position of circuit breaker 100 within the load center 520. For example, a snap action of the dome switch of the contact components 130 in combination with one or more pegs 322, 324, 326 provide an activation of a combination of one or more contact components 130 when pressed by a corresponding peg. When this occurs, a data transceiver, such as data transceiver 280 of FIG. 2, coupled to each of the contact components transmits a data signal. The data signal includes a plurality of data bits, where each data bit indicates whether a corresponding contact component of the combination is activated or not activated by the peg configuration of a slot that the circuit breaker is installed.

Figure 6:
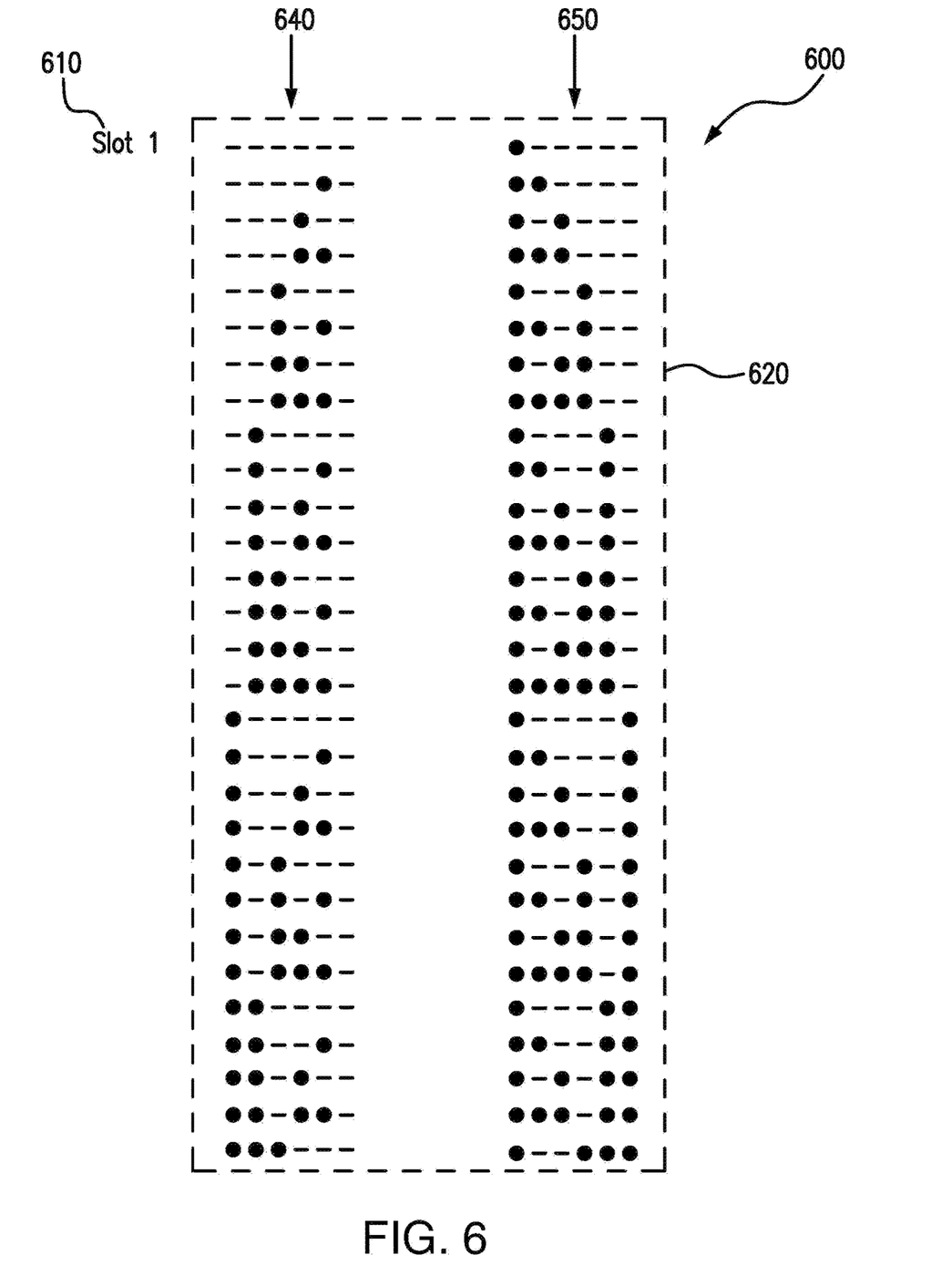
FIG. 6 is an example illustrating a load center peg configuration according to an embodiment of the disclosure.

FIG. 6 is an example illustrating a load center peg configuration 600 according to an embodiment of the disclosure. In this example, the load center peg configuration 600 is shown within a load center 620 (which may be the same as load center 520 of FIGS. 5A-B. As shown, there are two panel, a left-side panel 640 and a right-side panel 650, in the load center. In this configuration example, the load center panels have each slot fitted with 0-6 pegs to aid with identification of an inserted circuit breaker. In this regard, six (6) pegs may be the maximum number of pegs that can accommodate load centers with up to sixty-four (64) slots. Although only three (6) are shown in FIG. 6, the layout can comprise a plurality of pegs numbering more (or less) than the six pegs, which can be arranged in a plurality of rows and/or columns that make up more or less that the 64 slots.

Each slot location, in the a left-side panel 640 and a right-side panel 650, is represented by 0-based index. Each peg representing a physical representation of the binary identifier, such as Slot 1 has 0 pegs and is represented by the binary ID "000000", Slot 2 has 1 peg and is represented by the binary ID "000010" and so on. In some instances, the first slot may start at zero, which can be reserved for load centers without pegs.

The circuit breakers loaded into the slots of load center 620 have a corresponding set of six (6) contact components to accommodate insertion of up to six (6) pegs. Once inserted into a slot of the load center 650, the circuit breakers can then compute their slot location based on inserted pegs from the slot they are plugged in to. The circuit breaker can communicate to a connected hub or aggregator. Then, the circuit breaker can communicate with a connected hub or aggregator to provide the position information.

Figure 7:
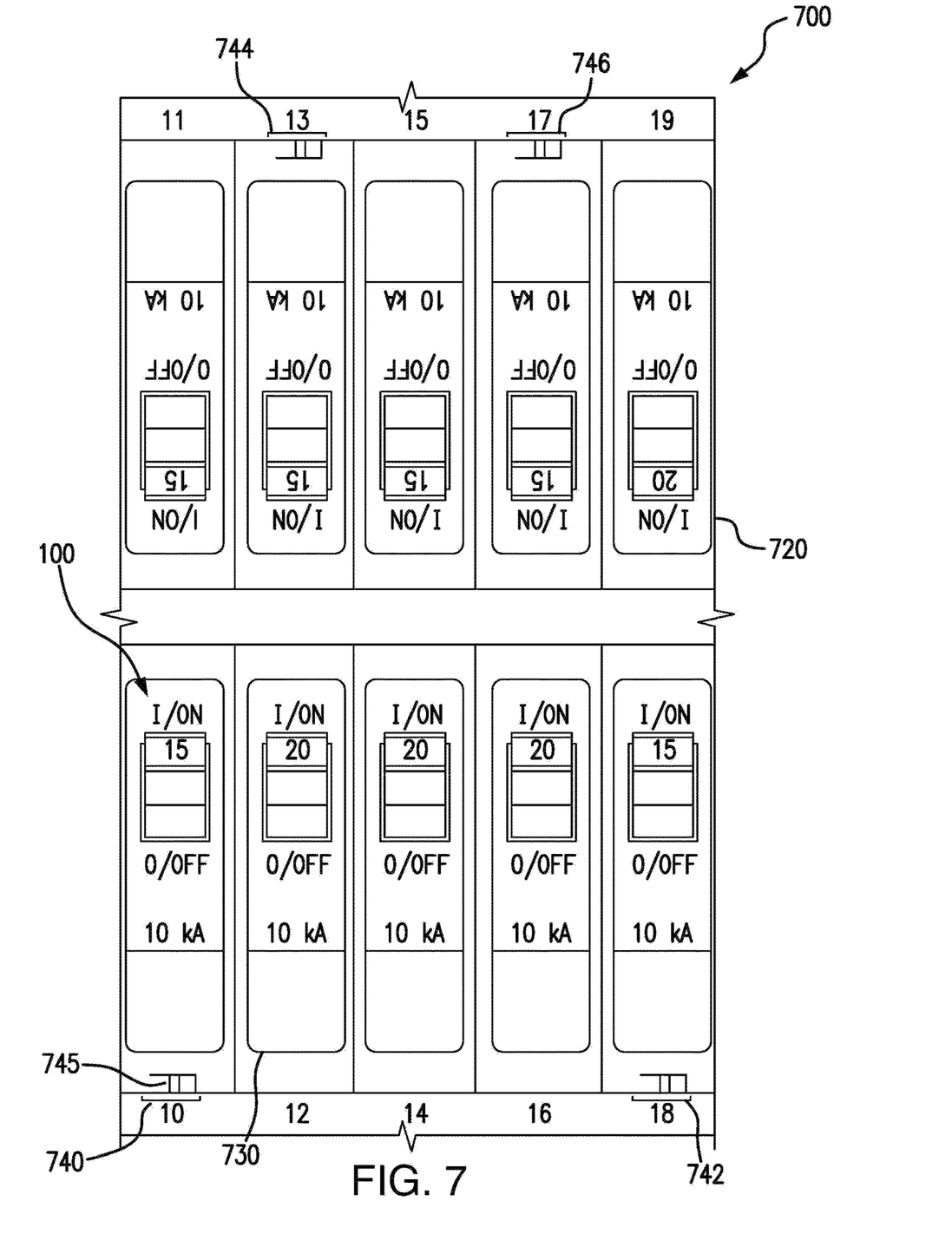
FIG. 7 is an example illustrating a load center according to an embodiment of the disclosure.

FIG. 7 is an example illustrating a load center 720 according to an embodiment of the disclosure. With particular reference to FIG. 7, persons of ordinary skill in the art will understand that they are looking at a panel board represented by a load center 720 (which may be the same a load center 320 of FIG. 3, load center 520 of FIG. 5 and load center 620 of FIG. 6) with its individual slot positions populated by circuit breakers (sometimes referred to just as "breakers") collectively. In some instances, some of circuit breakers, such as circuit breaker 100, can report a self-status data signal that includes a position identifier of which slot in the load center 720 the circuit breaker is installed.

The slot positions are typically referred to by numbers, such as 10, 11, 12, 13, 14, 15, 16, 17, 18, 19, which can be stamped into the faceplate of an enclosure of the load center 720 as shown. The breakers are arranged where even-numbered positions are in one column while odd-numbered positions are in the adjacent column. While illustrated and described in the context of residential load centers, it will be understood the present invention is applicable to commercial and industrial load centers and panel boards, OEM circuit breaker panel applications, and any enclosure containing multiple circuit breakers where communications are used.

In this example, some of the circuit breakers, such as circuit breaker 100, ace equipped with a base and a plurality of contact components 740, 742, 744, 746 coupled to the base. In that regard, an activation of a combination of the contact components 740, 742, 744, 746 indicates a position of the circuit breaker within the load center. The activation of the combination indicates that one or more of the contact components 740, 742, 744, 746 is in contact with one or more pegs coupled to the load center, such as pegs 745.

The circuit breakers that are equipped with the contact components 740, 742, 744, 746 are installed in the load center 720 in slot locations that include one or more pegs, such as pegs 745. For example, slots 10, 13, 17 and 18, may include an addressing adapter, such as addressing adapter 400 that is holding the pegs 745 in each slot. As such, when the circuit breaker is installed in the slots 10, 13, 17 and 18, of the load center 720 that includes an addressing adapter, a data signal, such as data signal 285 of FIG. 2, is generated by the circuit breaker. This data signal includes a certain data bit configuration, such as "100", to indicate the circuit breaker's slot position with respect to the load center 720. This data signal may be then received by any desired transmission apparatus for forwarding on the load center data to a remote location, e.g. wired or wireless RF or the like.

The various embodiments disclosed herein can be implemented as a system, method or computer program product. Accordingly, aspects can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects can take the form of a computer program product embodied in one or more computer-readable medium(s) having computer-readable program code embodied thereon.

Any combination of one or more computer-readable medium(s) can be utilized. The computer-readable medium can be a non-transitory computer-readable medium. A non-transitory computer-readable medium can be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium can be transmitted using any appropriate medium, including but not limited to wireless, wireline, optical fiber cable, RF, etc., or any suitable combination of the foregoing.

Examples described herein also relate to an apparatus for performing the methods described herein. This apparatus may be specially constructed for performing the methods described herein, or it may comprise a general-purpose computer system selectively programmed by a computer program stored in the computer system. Such a computer program may be stored in a computer-readable non-transitory tangible storage medium.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to include, "based at least in part on," such that an un-recited feature or element is also permissible.

Some portions of the detailed descriptions are presented in terms of algorithms and symbolic representations of operations on data bits within a computer memory. These algorithmic descriptions and representations are the means used by those skilled in the video processing arts to most effectively convey the substance of their work to others skilled in the art. An algorithm is here, and generally, conceived to be a self-consistent sequence of steps leading to a desired result. The steps are those requiring physical manipulations of physical quantities.

It is to be understood that the above description is intended to be illustrative, and not restrictive. Many other embodiment examples are apparent upon reading and understanding the above description. Although the disclosure describes specific examples, it is recognized that the systems and methods of the disclosure are not limited to the examples described herein but can be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A circuit breaker comprising:
a base;
a plurality of contact components coupled to the base; and
a data transceiver coupled to the plurality of contact components, wherein the data transceiver is configured to transmit a data signal in response to an activation of the combination of the contact components, indicating a location of the circuit breaker within a load center.

2. The circuit breaker of claim 1, wherein the activation of the combination indicates that one or more of the contact components is in contact with one or more pegs coupled to the load center.

3. The circuit breaker of claim 2, wherein the one or more pegs are coupled to an addressing adapter that is configured to attach to the load center.

4. The circuit breaker of claim 2, wherein each contact component is disposed within a guiding channel of the base.

5. The circuit breaker of claim 4, wherein the guiding channel of the base is configured to receive the one or more pegs of a determined length.

6. The circuit breaker of claim 5, wherein at least one of the pegs comprises a spring portion, and wherein the spring portion is configured to reduce the determined length of the peg in response to connecting to a corresponding contact component.

7. The circuit break of claim 5, wherein the determined length of each peg indicates whether the peg is configured to meet a corresponding contact component.

8. The circuit breaker of claim 7, wherein the corresponding contact component is activated when the peg is connected to the corresponding contact component.

9. The circuit breaker of claim 1, wherein the data signal comprises a plurality of data bits, and wherein each data bit indicates whether a corresponding contact component of the combination is activated or not activated.

10. The circuit breaker of claim 1, wherein the location of the circuit breaker within the load center comprises a slot location in a panel of the load center.

11. A load center comprising:
a plurality of circuit breakers, each circuit breaker comprising:
a base;
a plurality of contact components coupled to the base; and
a data transceiver coupled to each of the contact components, wherein the data transceiver is configured to transmit a data signal in response to an activation of the combination of the contact components, indicating a location of the circuit breaker within a load center.

12. The load center of claim 11, wherein the activation of the combination indicates that one or more of the contact components is in contact with one or more pegs coupled to the load center.

13. The load center of claim 12, wherein the one or more pegs are coupled to an addressing adapter that is configured to attach to the load center.

14. The load center of claim 12, wherein each contact component is disposed within a guiding channel of the base.

15. The load center of claim 14, wherein the guiding channel of the base is configured to receive the one or more pegs of a determined length.

16. The load center of claim 15, wherein at least one of the pegs comprises a spring portion, and wherein the spring portion is configured to reduce the determined length of the peg in response to connecting to a corresponding contact component.

17. The load center of claim 15, wherein the determined length of each peg indicates whether the peg is configured to meet a corresponding contact component.

18. The load center of claim 17, wherein the corresponding contact component is activated when the peg is connected to the corresponding contact component.

19. The load center of claim 11, wherein the data signal comprises a plurality of data bits, and wherein each data bit indicates whether a corresponding contact component of the combination is activated or not activated.

20. The load center of claim 11, wherein the location of the circuit breaker within the load center comprises a slot location in a panel of the load center.

21. A circuit breaker comprising:
a plurality of contact components, wherein an activation of a combination of the plurality of contact components (i) is based on one or more of the contact components in the plurality of contact components being in contact with one or more pegs coupled to a load center, and (ii) indicates a location of the circuit breaker within the load center; and
a base coupled to the plurality of contact components and comprising a guiding channel configured to receive the one or more pegs, wherein a first contact component of the plurality of contact components is disposed within the guiding channel, wherein a length of each of the one or more pegs indicates whether the respective peg is configured to meet a corresponding contact component.

22. The circuit breaker of claim 21, wherein the one or more pegs are coupled to an addressing adapter that is configured to attach to the load center.

23. The circuit breaker of claim 21, wherein at least one of the pegs comprises a spring portion, and wherein the spring portion is configured to reduce a length of the peg in response to connecting to a corresponding contact component.

24. The circuit breaker of claim 21, wherein the corresponding contact component is activated when the peg is connected to the corresponding contact component.

25. A load center comprising a plurality of circuit breakers, wherein at least one of the plurality of circuit breakers comprises a circuit breaker according to claim 21.

26. A circuit breaker comprising:
a plurality of contact components, wherein an activation of a combination of the plurality of contact components (i) is based on one or more of the contact components in the plurality of contact components being in contact with one or more pegs coupled to a load center, and (ii) indicates a location of the circuit breaker within the load center; and
a base coupled to the plurality of contact components and comprising a guiding channel configured to receive the one or more pegs, wherein a first contact component of the plurality of contact components is disposed within the guiding channel, wherein at least one of the pegs comprises a spring portion, and wherein the spring portion is configured to reduce a length of the peg in response to connecting to a corresponding contact component.

* * * * *